United States Patent [19]

Babcock

[11] Patent Number: 4,485,802

[45] Date of Patent: Dec. 4, 1984

[54] SOLAR HEATER FOR SWIMMING POOLS

[76] Inventor: Horace W. Babcock, 2189 N. Altadena Dr., Altadena, Calif. 91001

[21] Appl. No.: 319,122

[22] Filed: Nov. 9, 1981

[51] Int. Cl.³ .............................................. F24J 3/00
[52] U.S. Cl. ..................................... 126/416; 126/446; 126/432; 126/423; 126/452; 4/507; 4/509
[58] Field of Search ............... 126/452, 416, 415, 432, 126/446, 448, 423; 4/380, 488, 493, 507, 508, 509; 137/396

[56] References Cited

U.S. PATENT DOCUMENTS

| | | | |
|---|---|---|---|
| 202,586 | 4/1878 | Rhoads | 137/396 X |
| 2,167,576 | 7/1939 | Kiser | 126/423 |
| 2,739,939 | 3/1956 | Leslie | 4/509 X |
| 3,215,134 | 11/1965 | Thomason | 126/444 |
| 3,236,294 | 2/1966 | Thomason | 126/449 X |
| 3,910,253 | 10/1975 | Thomason et al. | 126/432 |
| 3,991,742 | 11/1976 | Gerber | 126/449 |
| 4,052,975 | 10/1977 | Ceidebury | 126/436 |
| 4,061,132 | 12/1977 | Ashton et al. | 126/419 |
| 4,084,578 | 4/1978 | Ishibashi | 126/423 |
| 4,211,213 | 7/1980 | Nissen et al. | 126/416 X |
| 4,373,220 | 2/1983 | Selsted | 4/508 |

Primary Examiner—Larry Jones
Attorney, Agent, or Firm—Sellers and Brace

[57] ABSTRACT

A solar heater for swimming pools is provided having one or more heating panels installable on a roof or the like and arranged to discharge into a pool equipped with an apron without need for disturbing or obstructing the apron. This is accomplished by the provision of an elevated bistable dumper adjacent the perimeter of the apron having a dispensing spout normally inclined upwardly but pivoting at intervals to discharge into the pool across the apron without obstructing it. Water to be heated is diverted from the pool filtering system to the solar heater via a pressure regulator and a solar responsive flow control.

15 Claims, 3 Drawing Figures

SOLAR HEATER FOR SWIMMING POOLS

This invention relates to a solar water heater, and more particularly to a unique simple and inexpensive water heater for swimming pools installable in an existing pool without need for disturbing or obstructing the pool apron.

BACKGROUND OF THE INVENTION

Solar water heaters for swimming pools have been proposed but a serious obstacle to their utilization is the need to break through the pool apron and wall to install the heated water return pipe or to disfigure and obstruct the apron by installing the return across the top of the apron. Additionally solar heaters heretofore proposed are more complex and costly than is desirable and have inadequate provision for governing the rate of flow and for limiting flow to periods when solar heat is effective.

SUMMARY OF THE INVENTION

The present invention provides a simple inexpensive solar heater particularly suitable for installation by the homeowner in swimming pool equipped with an integral apron. The need for breaking through or disfuguring the pool apron is obviated by the use of a bistable warm water return facility utilizing an elevated bistable water collector and dumper. This dumper automatically assumes an upright water collecting position until substantially full at which time it tilts its discharge spout downwardly to discharge the heated water into the pool and then automatically resumes its collecting position. As shown the bistable dumper is located below the lower end of the solar heater but above a level interfering with the free use of the pool's apron. Pool water is diverted from the customary filtering system to a simple but highly reliable pressure regulator arranged to discharge into the top of the solar heater and in series with a sunresponsive valve.

Accordingly, it is a primary object of this invention to provide a unique and improved solar water heater for a swimming pool.

Another object of the invention is the provision of a roof-supported solar water heater for an apron-equipped swimming pool having a warm water return to the pool utilizing an elevated bistable water dumper.

Another object of the invention is the provision of a solar water heater kit adapted to receive water from the pool filtering system and returning the heated water to the pool via a bistable dumper at an elevated position beside the rim of the pool apron.

Another object of the invention is the provision of a simple inexpensive solar water heater for a swimming pool readily installable by the home owner and equipped with automatic means for intermittently returning heated water to the pool at a level overlying the pool apron.

These and other more specific objects will appear upon reading the following specification and claims and upon considering in connection therewith the attached drawing to which they relate.

Referring now to the drawing in which a preferred embodiment of the invention is illustrated:

Figures 1, 2, 3:
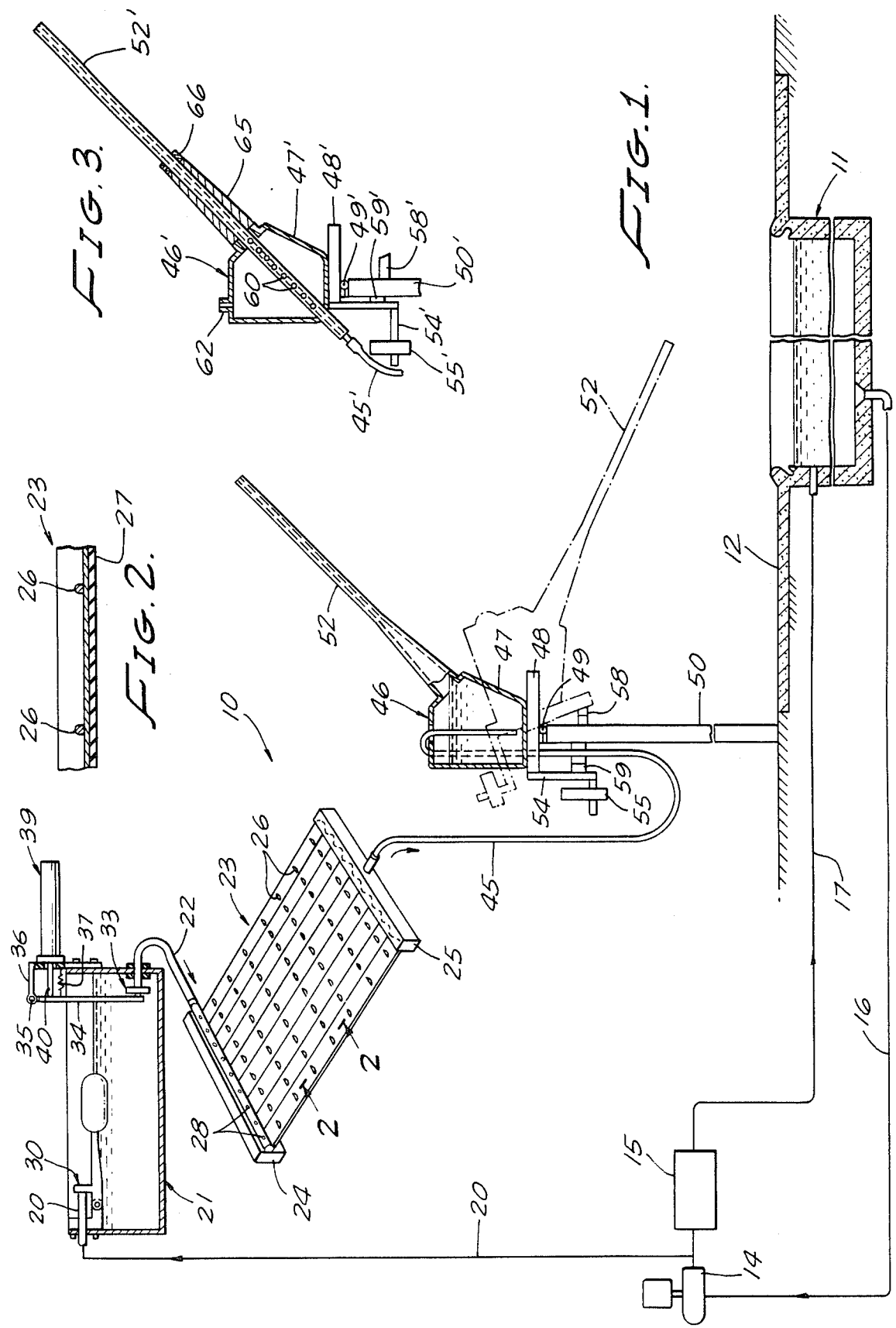
FIG. 1 is a general diagrammatic view with parts in cross section illustrating one illustrative embodiment of the invention.
FIG. 2 is a fragmentary cross sectional view on an enlarged scale taken along line 2—2 on FIG. 1.
FIG. 3 is a cross sectional view through an alternate embodiment of the automatic bistable water dumper.

Referring initially more particularly to FIG. 1, there is shown an ilustrative embodiment of the invention solar heating system, designated generally 10, operatively associated with a swimming pool 11 equipped with a surrounding masonary apron 12. The pool is serviced by a filtering system comprising a motor-driven circulating pump 14 and a filter 15 connected in series with inlet pipe 16 and a return pipe 17. A portion of the recirculating water is diverted through a pipe 20 leading to a pressure regulator 21 serving to control the pressure of the water delivered via distributing header 22 to the upper end of a downwardly inclined solar heater 23 mounted on any suitable structure, such as a building roof adjoining pool 11.

Although the heater is shown as connected to the pool filtering system, pipe 20 may be provided with a valve and a connection to the municipal water supply. In this event the heater can be employed to heat makeup water for the pool and operated independently of the filtering system at the user's option.

In the interest of economy, simplicity, and ease of installation, solar heater 23 is here shown as comprising a corrugated aluminum panel provided with a suitable support, such as the upper and lower headers 24, 25. Preferably, each corrugation trough is provided with a series of low-height barriers or dams 26 over which the water cascades to slow the rate of flow and enhance the absorption of heat from adjacent areas of the panel. The top surface of panel 23 is coated with a suitable heat absorbing protective layer, such as a glossy black marine enamel, and the shiny heat reflecting lower surface is covered by a layer of heat insulation 27 (FIG. 2).

It will be understood that solar heater 23 may include one of an array of corrugated panels arranged side by side and provided with a water distributing pipe 22 having a separate outlet port 28 dispensing water into the upper end of each corrugation trough.

It is desirable that water to be heated be dispensed into the troughs of heater 20 under a constant static head of a few inches of unpressurized water, a head of 2 to 6 inches being found quite satisfactory. This objective is achieved in any suitable manner, such as by a float-controlled inlet valve 30 normally maintained seated against the end of inlet pipe 20 by the water level within regulator 21. It will be understood that the regulator housing is positioned horizontally near the upper header 24 of heater 23.

It is also desirable that the water not be delivered to the solar heater except when the sun is shining at an appropriate intensity for effective and efficient utilization. Accordingly, the inlet to the water distributing pipe 22 is preferably provided with a valve 33 pivotally supported on the lever 34 connected by pin 35 to a bracket 36 secured to the pressure regulator housing. A tension spring 37 connected between arms 34 and bracket 36 normally biases valve 33 to its closed portion. However, when the sun is shining, the thermal actuator 39 extends its plunger 40 against arm 34 and opens valve 33.

Sun-heated water cascading downwardly along heater 23 collects in the lower header 25 and is conveyed by hose 45 into the bistable dumper, designated gennerally 46. As here shown, dumper 46 comprises a several-gallon container suitably secured to a base 48 pivotally connected by a hinge 49 to the upper end of a pedestal 50 anchored in the ground adjacent the rim of pool apron 12. One upper corner of container 47 is provided with a semi-flexible dispensing spout and duct 52 extending upwardly and outwardly across pool apron 12 and sufficiently long to discharge the container contents into the pool when tilted downwardly to the dot and dash line dumping position shown in FIG. 1.

The left-hand end of container support 48 is provided with an L-shaped bracket 54 adjustably supporting a counterweight 55. Preferably this counterweight is an eccentric or the like thereby enabling one to vary the center of gravity of dumper 47 both horizontally and vertically relative to the axis of hinge 49 and as appropriate to maintain dumper 46 in the upright water collecting position until nearly full. At that time the centroid of the dumper will shift to the right of the axis of hinge 49 whereupon it will pivot clockwise automatically until it comes to rest against a resilient bumper 58 mounted on pedestal 50. A second resilient bumper 59 mounted on the opposite side of pedestal 50 to engage bracket 54 as container 47 pivots back to its upright position at the end of a dumping cycle.

The operation of the FIG. 1 embodiment of the invention will be readily apparent from the foregoing detailed description of its components. When the pump 14 of the filtering system is operating, a portion of the water being filtered is diverted through pipe 20 to the pressure regulator 21 until the water level activates float valve 30. Thereafter this valve maintains a constant head of water over each of the water distributing openings 28 at the top of heater 23. However, no water is distributed to the heater until and unless the solar responsive valve 33, 39 has been heated by the sun to an appropriate operating temperature, such as 80° F. At this time its valve 33 opens and allows the water to flow to the heater under the constant head maintained by float valve 30. The heated water then collects in the bistable dumper 46 until its centroid shifts slightly to the right of the pivot of hinge 49 whereupon the dumper automatically tilts clockwise to the dot and dash line position and dumps its contents into the pool. When the dumper is substantially empty its centroid shifts leftward, whereupon the dumper automatically resumes its upright position.

As will be recognized, the invention has a number of virtues in addition to those noted above. Not only does it demonstrate the value of solar heating in a tangible manner but it also provides a focal point of action and gives swimmers the opportunity and joy of an occasional warm shower. The dumper can also be fitted with a bell or other audible device enhancing the value of the pool.

The alternate embodiment of the invention illustrated in FIG. 3 differs only as respects details of the bistable dumper. Accordingly, its components are identified by the same reference characters but are distinguished by the addition of a prime. A principal difference is that the semi-flexible dispensing duct 52' extends diagonally downwardly across the interior of the collecting container 47' of the bistable dumper 46' and through its lower corner. As shown in FIG. 3, the warm water return hose 45' is shown connected to the lower end of duct 52' and discharges the warm water into the interior of container 47' through a series of openings 60. When the container becomes substantially filled with heated water, it pivots to the right on hinge 49' and dumps its contents into the pool via openings 60 which now serve as outlet openings.

In an alternate mode of use of the bistable dumper 46', hose 45' may be detached from the lower end of dispensing pipe 52' and connected to the tubular inlet 62 at the top of container 47'. When so connected the lower end of duct 52' is closed by a plug. The anchorage of the dispensing duct 52' to the diagonally opposed corners of container 47' utilizes this pipe to strengthen both the pipe and the container and to distribute the stresses more uniformly between these components. Additionally, the portion of duct 52' passing through the upper corner of the container may be embraced by a reinforcing sleeve 65 suitably screw threaded or otherwise assembled to the top of the container and provided with sealing gaskets 66 at its ends. It will also be understood that duct 52 of the first embodiment and its conical lower end may be held assembled to container 47 in FIG. 1 by threaded bushing or the like, not shown.

While the particular solar heater for swimming pools herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Solar water heating apparatus for use with a swimming pool surrounded by an apron comprising:

solar heater means supported in an inclined elevated position adjacent the outer perimeter of said pool apron;

first duct means for supplying water to be heated to the upper end of said solar heater means for gravity flow therethrough;

bistable water collecting and dumping means adjacent the inner perimeter of said pool apron operable to discharge the contents thereof when substantially full into said pool;

and duct means positioned at a height above said pool apron adequate to avoid obstructing the free passage therepast of persons using said pool apron and having its ends interconnecting said bistable water collecting and dumping means and the lower outlet end of said solar heater means;

and said solar heater means positioned at a substantial height above said bistable water collecting and dumping means.

2. Solar water heating apparatus as defined in claim 1 characterized in that said collecting and dumping means comprises water container means pivotably supported for movement between an upright filling position and a nonupright dumping position, and means for restoring said collecting means to said upright position for refilling with water from said heater means after dumping water therefrom.

3. Solar heating apparatus as defined in claim 1 characterized in that said water collecting and dumping means includes third duct means carried thereby with one end opening into the interior of said collecting means and adapted to convey water therefrom across the pool apron and into the pool without interfering with the use of underlying portions of said apron by a passer by.

4. Solar heating apparatus as defined in claim 3 characterized in that said third duct means projects outwardly and upwardly from said collecting and dumping means while said collecting means is filling with water from said heating means and pivoting with said collecting means to a downwardly inclined position to dump water into the pool.

5. Solar heating apparatus as defined in claim 3 characterized in that said third duct means extends diagonally across the interior of said water collecting means with the lower end anchored adjacent one lower corner of said collecting means and having one or more ports distributing therealong opening into said collecting means, and said third duct means passing through the diagonally opposed upper corner of said collecting means.

6. Solar heating apparatus as defined in claim 5 characterized in that said third duct means extends through the lower corner of said collecting means and includes a length of flexible hose opening into the discharge end of said second duct means.

7. Solar heating apparatus as defined in claim 1 characterized in that said first means includes sun controlled thermally responsive valve means operable to admit water to said solar heater means when activated by the sun.

8. Solar heating apparatus as defined in claim 1 characterized in the provision of water level control means for admitting water to be heated to the upper end of said heater means at a generally uniform static pressure head.

9. Solar water heating apparatus as defined in claim 1 characterized in that said heater means comprises a panel of sheet material corrugated lengthwise thereof; and said water supply duct for said heater means including flow control means for discharging water onto the upper end of said panel at a generally uniform static head of water.

10. Solar water heating apparatus as defined in claim 9 characterized in that said water flow control means includes thermal valve means operable to the open position thereof when heated to a predetermined temperature by the sun and closed when not so heated.

11. A method of returning heated water from a solar water heater mounted on the roof of a building to an adjacent swimming pool of the type surrounded by a masonry apron without disturbing said apron and without obstructing the use of said apron by a passerby which improvement comprises:

mounting a bistable container substantially above the pool apron and adjacent the outer edge thereof which container is normally biased to an upright filling position and is temporarily tiltable automatically to a non-upright dumping position when filled with a predetermined quantity of water;

conducting heated water from said solar heater to said bistable container by duct means positioned sufficiently above said masonry apron as not to obstruct the use of said apron by a passerby; and providing said container with dispensing duct means operable to dump the contents thereof across the pool apron and into the pool when tilted to said non-upright position without obstructing the use of the apron by a passerby.

12. That method defined in claim 11 which comprises the step of providing said bistable container with means for arresting and cushioning the approach of said container to said upright and non-upright positions.

13. That method defined in claim 11 which comprises the step of providing said container with means for counterbalancing the same to said upright position after a predetermined quantity of water has been dispensed therefrom while tilted to said non-upright position.

14. That method defined in claim 11 which comprises the step of attaching said dispensing means to said container so as to be inclined upwardly when the container is upright and to be inclined downwardly across a pool apron when said container is in said non-upright water dispensing position.

15. That method defined in claim 11 characterized in the steps of withdrawing water from the swimming pool and discharging it onto the upper end of said solar heater.

* * * * *

UNITED STATES PATENT AND TRADEMARK OFFICE
CERTIFICATE OF CORRECTION

PATENT NO. : 4,485,802
DATED : December 4, 1984
INVENTOR(S) : Horace W. Babcock

It is certified that error appears in the above-identified patent and that said Letters Patent is hereby corrected as shown below:

Col 4, Claim 1, 1 39, delete "and"
Col 5, Claim 7, 1 20, after "first" insert --duct--

Signed and Sealed this

Twenty-third Day of July 1985

[SEAL]

Attest:

DONALD J. QUIGG

Attesting Officer

Acting Commissioner of Patents and Trademarks